Nov. 22, 1938.   S. VORECH   2,137,961
CONTROL MECHANISM
Filed Nov. 4, 1936
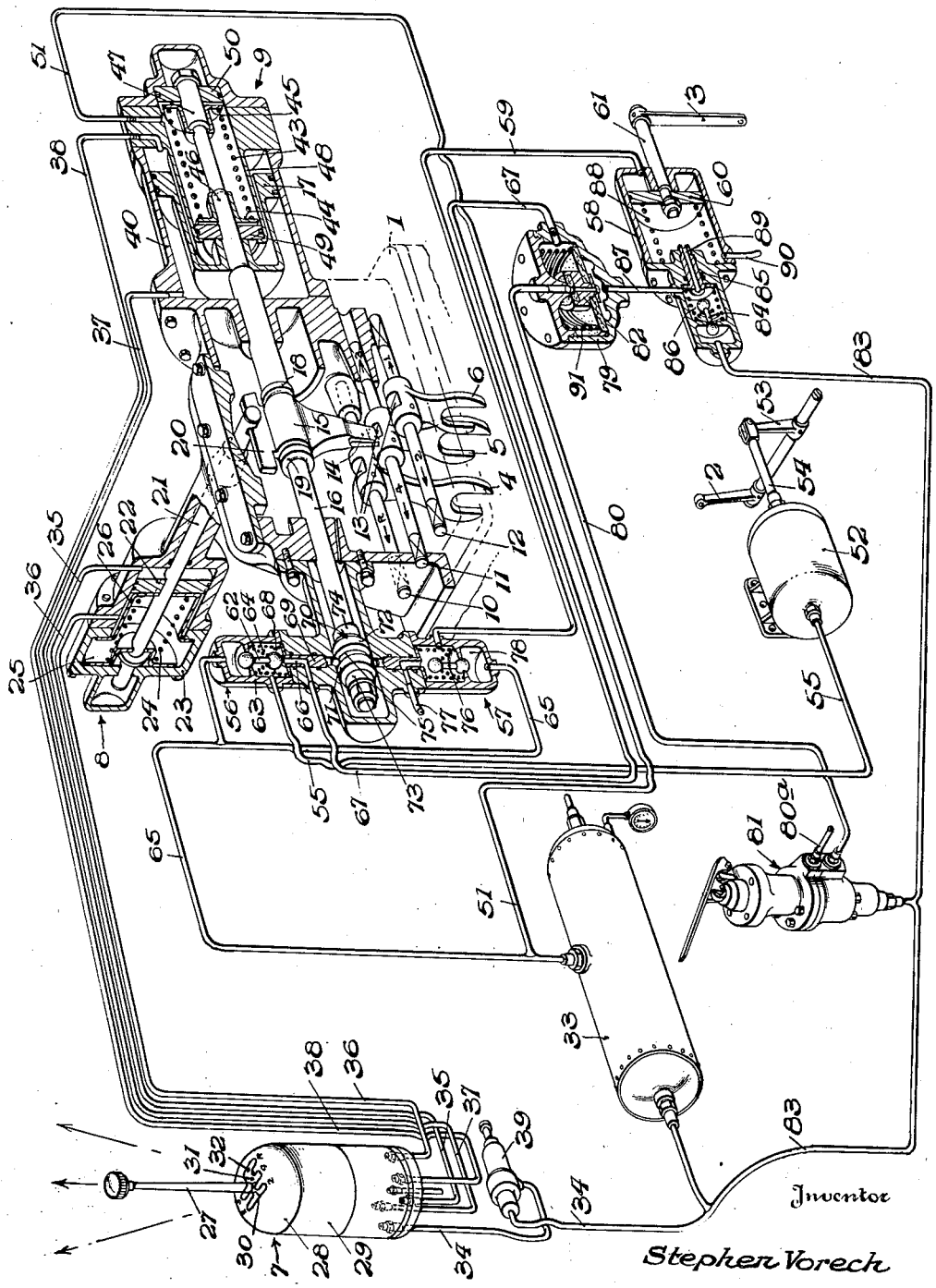
Inventor
Stephen Vorech
By N. D. Parker Jr.
Attorney Patented Nov. 22, 1938

2,137,961

UNITED STATES PATENT OFFICE 2,137,961

CONTROL MECHANISM

Stephen Vorech, Pittsburgh, Pa., assignor to Bendix-Westinghouse Automotive Air Brake Company, Pittsburgh, Pa., a corporation of Delaware Application November 4, 1936, Serial No. 109,197

14 Claims. (Cl. 192—3.5)

This invention relates to vehicle control apparatus and more particularly to remove control mechanism for effecting efficient operation of a transmission gearing and vehicle clutch devices.

One of the objects of the present invention is to provide a power-operated gear-shifting mechanism operable to shift the gears of an automotive vehicle transmission in an efficient manner and without the danger of clashing or injuring the teeth of the gears.

Another object of the invention is to provide a novel synchro-shift transmission and control means therefor to enable a rapid and efficient change in the gear relations of the transmission without harm to the gears thereof.

Still another object is to provide clutches arranged forwardly and rearwardly of a transmission together with novel control mechanism therefor in order to effect a complete isolation of the transmission both from the engine and the driven shaft during a gear-changing operation.

A further object is to provide, in a control mechanism for a synchro-shift transmission, a novel arrangement for securing automatic timed relation between the operation of the clutches and the shifting of the gears, thus relieving the operator of the necessity of doing anything more than merely moving a single control member.

A still further object is to provide, in a mechanism of the above character, a novel construction ensuring engagement of the rear clutch prior to engagement of the forward clutch after a gear relation has been established to the end that the transmission of power may be smoothly resumed at the new gear relation.

Other objects and novel features of the invention will appear more fully hereinafter from the following detailed description when taken in connection with the accompanying drawing. It is to be expressly understood, however, that the drawing is employed for purposes of illustration only and is not designed as a definition of the limits of the invention, reference being had for this purpose to the appended claims.

In the drawing, the single figure of which illustrates in perspective, certain parts being shown in section, a transmission and clutch control device constructed in accordance with the present invention, a vehicle transmission gearing 1 of any suitable type has associated therewith forward and rear clutch-actuating members 2 and 3 respectively, the clutches controlled by such members being well known in the art and hence not being illustrated. The transmission 1 includes shifter forks 4, 5 and 6 engaged with the transmission gears or clutches, not shown, which are shiftable in the usual manner to establish a desired gear relation. In the present instance, a selection and establishment of the desired gear relation is effected through a power-operated mechanism remotely controlled through a manually-operable unit 7, the operation of such unit being controlled by the operator for effecting not only the establishment of the desired gear relation but also the proper operation of the clutch-controlling members 2 and 3 in a manner which will appear more fully hereinafter.

For the purpose of remotely effecting the selection and establishment of a desired gear relation, under the control of unit 7, the present invention provides a selecting fluid actuator 8 and a shifting fluid actuator 9, said actuators being associated with the usual shifting bars 10, 11 and 12 of the vehicle transmission 1. As shown, these bars carry the shifter forks 4, 5 and 6 which are provided with the usual slotted portions 13, adapted to be selectively engaged by the lower end 14 of a combined selector and shifter finger 15, the latter being slidably mounted on a piston rod 16 of a piston 17, the relative sliding movement between said finger and said piston rod being limited as by means of a pair of sleeves 18 and 19 secured to the piston rod. From this construction, it will be perceived that a slight amount of lost motion exists between the piston rod 16 and the finger 15, permitting movement of the former prior to movement of the latter. The finger 15 is, moreover, provided with an elongated flanged extension 20 having a suitable connection with a piston rod 21 carried by a piston 22, the last named piston being associated with the selector actuator 8 while the piston 17 is associated with the shifting actuator 9.

The actuator 8 is adapted to control the selecting movements of the member 15 through the connections above described, and, in order to secure such control, the same is adapted to be supplied with fluid pressure from the remotely-positioned controlling device 7. The actuator 8 includes a cylinder 23 housing the piston 22, and, in order that the latter may be normally centered with respect to the cylinder, for the purpose of maintaining the shifting finger 15 in the neutral position shown on the drawing, a single precompressed resilient device such as spring 24 is employed, the expansion of the spring in opposite directions being limited by means of cups 25 and 26. In assembling the parts of the actuator 8, the spring 24 is placed under a slight initial compression, and, from this construction, it will be readily observed that the piston rod 21, and hence the shifting finger 15, is resiliently maintained in a central or neutral position when fluid pressure is exhausted from both ends of the cylinder 23.

The remotely-positioned manually-operable control device 7 is located conveniently to the operator of the vehicle and is preferably constituted as disclosed in the application of Stephen Vorech, Serial No. 57,447, filed January 3, 1936, now matured into Patent No. 2,075,917, granted April 6, 1937. Such device includes two pairs of valve mechanisms adapted to be operated as by means of a control lever 27, movements of which are suitably guided as by means of a slotted cover 28 on a casing 29. As shown, the cover 28 is provided with a pair of parallel guiding slots 30 and 31 together with a third slot 32, all of said slots being connected together so that the lever 27 may be moved laterally from one to the other. With the present arrangement, movement of the control lever 27 to the left into slot 30 serves to effect operation of a valve controlling the flow of fluid pressure from a reservoir 33 to the right-hand end of actuator 8 through conduits 34 and 35, while movement of the lever 27 to the right into slot 32 serves to operate a valve within casing 29 to connect the reservoir with the left end portion of the actuator through conduits 34 and 36. It will, therefore, be apparent that lateral movement of the lever 27 to the left and right, as viewed in the drawing, serves to effect selecting operation of the actuator 8 in opposite directions. Forward movement of lever 27 in slot 30 serves to operate an additional valve within casing 29 in order to connect the reservoir 33 to the left-hand portion of actuator 9 by way of conduit 37, while rearward movement of the lever 27 in slot 30 operates a valve controlling the flow of fluid pressure from the reservoir to the right-hand portion of actuator 9 by way of conduits 34 and 38. From the foregoing, the construction and operation of unit 7 will be clear, it being borne in mind that lateral movement of the control lever 27 controls the selecting actuator 8, while longitudinal movements of the lever 27 in slots 30, 31 or 32 all serve to operate the same valves which control the flow of fluid pressure to the shifting actuator 9. Conduit 34 leading from the reservoir 33 to the intake chamber of the unit 7 may, if desired, have included therein any suitable type of fluid pressure-regulating valve 39 in order to limit the pressures which may be admitted to the transmission-controlling mechanism.

The shifting actuator 17 more particularly may be constructed as shown in the application of Roy S. Sanford, Serial No. 57,410, filed January 3, 1936, or in any other suitable manner. In the interests of simplicity, said actuator is shown herein as including a cylinder 40 housing the piston 17, the latter being secured to the piston rod 16 so as to impart movement thereto in either direction. In order to provide a construction for cushioning or retarding the movement of the shifter actuator when the gear relation is about to be established, the actuator 9 is provided with a precompressed spring 43 which is confined between a pair of cups 44 and 45, the engagement between the latter and sleeves 46 and 47 serving to limit the expansive force of the spring 43. The latter is housed within a cylinder 48 which houses a pair of pistons 49 and 50 which are respectively slidably mounted upon the sleeves 46 and 47. The pistons 49 and 50 are normally maintained in the position shown as by means of fluid pressure conducted from the reservoir 33 to the cylinder 48 by way of conduit 51, this construction forming not only a part of the cushioning means but also an efficient arrangement of automatically neutralizing the gear relations.

In order to effectively and efficiently control the operation of clutch-controlling members 2 and 3 in conjunction with the gear-shifting control mechanism heretofore described, the present invention utilizes a slight movement of the shifter piston rod prior to actual shifting movement of the selected shifter bar for the purpose of automatically controlling the forward and rear clutches, to the end that both of said clutches are completely disengaged prior to any movement of the selected shifter bar. In this manner, the transmission is isolated both from the vehicle engine and the driven shaft and the gear relation may thus be established without injury to the transmission. The construction is also such that, after establishment of the desired gear relation, the rear clutch is automatically permitted to engage prior to engagement of the front clutch, this sequence of operations being highly desirable when it is borne in mind that the rear clutch is generally of the jaw clutch type and is not designed for smooth engagement while taking up the load of the vehicle. The forward clutch which engages after the rear clutch closes automatically in a gradual and efficient manner, the arrangement completely avoiding any necessity on the part of the operator of manually controlling the forward clutch. However, the construction is such that the operator may manually control the forward clutch if desired.

For the accomplishment of the foregoing, the forward clutch-controlling member 2 is adapted to be actuated by a fluid motor 52 through connections 53 and 54, said motor being adapted to be supplied with fluid pressure through conduit 55 by means of valve mechanism 56. A similar valve mechanism 57 is adapted to supply fluid pressure to a fluid motor 58 by way of conduit 59, the said motor 58 being provided with a piston 60 operatively connected through the piston rod 61 to the rear clutch actuator 3.

The valve 56 includes a combined inlet and exhaust valve member 62 mounted within a casing 63 and normally urged, as by a spring 64, to close off communication between conduits 65 and 55. The casing 63 is provided with an exhaust passage 66 connecting a conduit 67 with outlet chamber 68. The exhaust passage is formed in a slidably-mounted valve-actuating element 69 which, when moved upwardly as shown in the drawing, serves to contact the valve assembly 62 and move the same upwardly, such operation serving to interrupt communication between the conduit 67 and outlet chamber 68 and establish communication between said outlet chamber and conduit 65. Such movement of the element 69 is effected by means of a cam member 70, secured to piston rod 16 and formed with cams 71 and 72. With such an arrangement, movement of the piston rod 16 in either direction will effect valve-operating movement of the element 69 through cams 71 or 72. In either case, communication between passage 66 and chamber 68 will be cut off and fluid pressure will be conducted from conduit 65 through chamber 68 to the actuator 52 by way of conduit 55. Continued movement of the piston rod 16, in order to establish the selected gear relation, will serve to align the reduced portions 73 or 74 of the cam element 70 with the element 69 whereupon the valve 56 will be returned to the position indicated in the drawing, it being pointed out that this operation takes place after the rear gear relation has been established. In the neutral position shown, the element 69 is aligned with the reduced cam 75 which permits communication between the clutch motor 52 and the exhaust passage 66 of the valve in order to permit the engaging movement of the clutch-controlling member 2 in a manner which will be described hereinafter.

Since the valve 57 is similar in its detailed construction to the valve 56, it is not considered necessary to describe the same in detail. It is sufficient to note that simultaneously with the actuation of valve 56, valve 57 will be similarly operated to effect movement of the valve element 76 in order to close communication between conduit 59 and the exhaust connection 77 and connect said conduit with conduit 65 by way of an intake valve chamber 78. Initial movement of the piston rod 16 thus not only serves to conduct fluid pressure to the fluid motor 52 but also conducts fluid pressure to the motor 58, thus simultaneously disengaging both forward and rear clutches prior to the establishment of the selected gear relation.

After the desired gear relation has been established, it has been previously pointed out that the valves 56 and 57 will be returned to their normal position by reason of the engagement between the cam portions 73 or 74 with the valve-actuating elements of the valves. Since it is desirable to effect engagement of the rear clutch prior to engagement of the forward clutch, means is provided for preventing the exhausting of fluid pressure from the fluid motor 52 until after sufficient movement of the motor 58 has taken place as to ensure engagement of the rear clutch. To this end, the exhaust conduit 67 from the valve 56 is connected to a double check valve 79, which may be constructed in accordance with the principles set forth in Vorech Patent No. 2,040,580, said valve being also connected through a conduit 80 with the outlet chamber of a manually-operable clutch valve 81. The valve 81 is of the well-known self-lapping type, and is preferably constructed as disclosed in the patent to Wilfred A. Eaton No. 2,112,484, granted March 29, 1938. With the valve 81 in a released position, the exhaust from motor 52 is conducted through conduit 67, valve 79 and conduit 80 directly through valve 81 to an exhaust connection 80a of the valve 81. Preferably, the exhaust of said last named valve is restricted so that the exhaust of fluid pressure from the motor 52 takes place in a gradual manner in order to permit smooth clutch-engaging movement of the member.

The double check valve 79 normally closes the opening to conduit 80 and is provided with a pressure-responsive element 82 therein which is adapted to be subjected to fluid pressure from reservoir 33 by way of conduit 83 when the clutch motor 58 is energized. This is effected by providing a combined intake and exhaust valve member 84 adapted to be actuated by an element 85 movable to the left by piston 60 of the motor 58 when the latter is energized. When this occurs, valve member 84 is moved to open position to subject element 82 to reservoir pressure by way of conduit 83, valve chamber 86 and conduit 87. The marginal portion of element 82 will thus be moved against the action of spring 91 to connect conduits 87 and 67. When fluid pressure is exhausted from the clutch motor 58, on the other hand, the piston 60 therein will be moved to the right through the action of a spring 88 in order to effect engagement of the rear clutch. When this engagement is initiated, the exhaust passage 89 in element 85 will be uncovered by the piston 60, thus connecting the conduit 87 to the atmosphere by way of chamber 86, passage 89 and exhaust opening 90. Fluid pressure within valve 79 from conduit 67 will deflect the valve element 82 downwardly to uncover the opening to conduit 80, thus enabling exhausting of the conduit 67 to the valve 81 by way of conduit 80.

From the above, it will be clearly understood that the forward clutch will be permitted to engage after engagement of the rear clutch has been initiated and the transmission of torque from the engine to the driven shaft will hence take place efficiently and smoothly. In certain instances, it may be desirable to manually control the application and exhaust of fluid pressure to and from the forward clutch motor 52, in which event it is only necessary to operate the valve 81. It will be noted, however, that the valve is inoperative to control either clutch motor when both clutches are disengaged, this by reason of the fact that the control line for applying pressure from the valve 81 to the actuator 52 includes the double check valve 79, and when the clutch actuators are supplied with fluid pressure, the conduit 80 is closed by means of the pressure-responsive element 82. However, with the transmission in neutral position or after a desired gear relation has been completely established, operation of the manually-controlled valve 81 will serve to control the application of fluid pressure to the forward clutch motor 52 by way of conduit 80, valve 79, conduit 67, passage 66, chamber 68 and conduit 55. The valve 81, however, exerts no control over the clutch motor 58 associated with the rear clutch actuator.

In operation, assuming that it is desired to establish first gear relation, the control lever 27 is moved forwardly in slot 30 of the controlling device 7, it being understood that the initial lateral movement of the control lever serves to conduct fluid under pressure to the right-hand portion of actuator 8 through conduits 34 and 35. The actuator 8 will promptly be operated in such a manner that the piston rod 21 is moved to the left and the shifter finger 15 rocked to a position such that the lower end 14 thereof engages the notch 13 of the shifter fork 6. Continued movement of the control lever 27 forwardly in the slot 30 serves to conduct fluid under pressure from the reservoir 33 to the left-hand end of the shifting actuator 9 by way of conduits 34 and 37. The piston 17 of the shifting actuator will thereupon be moved to the right carrying piston rod 16 and shifter finger 15 in the same direction. The shift rod 12 will be moved correspondingly and first gear relation will be established.

It will be noted, however, that, in view of the fact that member 15 is connected to the piston rod 16 through a lost motion connection, the initial movement of the shifter piston rod will not effect movement of the shifter finger until a predetermined degree of movement of the piston rod 16 has been effected, such predetermined movement being defined by the position of sleeves 18 and 19 upon the piston rod 16. During this free movement of the piston rod, the valve-actuating elements of the valves 56 and 57 will be cammed upwardly and downwardly respectively by the cam 71, the valves 56 and 57 being accordingly operated, in the manner heretofore described, to supply fluid pressure to the forward and rear clutch actuators 52 and 58. The clutches controlled by such actuators will thereupon be promptly disengaged and this action thus ensures clutch disengagement prior to actual engagement of the gears establishing the first gear relation.

As heretofore pointed out, checking or cushioning means is associated with the shifting actuator 9 in order to retard that portion of the movement of the actuator when a gear relation is about to be effected. More particularly, as soon as the shifting actuator piston 17 and piston rod 16 have been moved a sufficient distance to the right as to bring cup 45 into engagement with piston 50, further movement of the piston assembly will serve to compress the preloaded spring 43. The remainder of the stroke of the piston assembly will thus be retarded or checked, thus ensuring that actual engagement of the selected transmission gears will be effected in a quiet and efficient manner. It will be observed that the above construction is such that the retarding means constituted by the spring 43 does not influence the stroke of the piston assembly until the gear relation is about to be established. In other words, the initial movement of the piston assembly takes place in a rapid manner under the influence of the pressure of the fluid exerted against the piston 17 and thus the gear relation is established as rapidly as possible, consistent with efficient operation as well as elimination of gear clashing.

Adjacent the limit of the stroke of the shifter piston and after engagement of the selected transmission gears has been effected, the valve-actuated elements of the valves 56 and 57 become aligned with the cam portion 73. When this occurs, both of the valves 56 and 57 are moved to exhaust position. The valve 56 controlling the forward clutch actuator 52, however, is prevented from exhausting by reason of the operation of the double check valve 79, it being recalled from the prior description that, when actuator 58 is supplied with fluid pressure, the valve 84 is operated to supply fluid pressure to the double check valve 79 by way of conduits 83 and 87. Such action moves the pressure-responsive element 82 upwardly to close off the exhaust conduit 67 of the valve 56. The valve 57, however, is free to exhaust the actuator 58 through conduit 59 and exhaust connection 77, and, when this occurs, the spring 88 of the actuator 58 serves to move the clutch-controlling member 3 to the right for engagement of the rear clutch. When this engagement has been initiated, the double check valve 79 is connected to the atmosphere through conduit 87, exhaust connection 89 and atmospheric connection 90, and, as soon as the pressure-responsive element 82 uncovers the connection to conduit 80, the valve 56 exhausts through the interconnected conduits 67 and 80 and to the atmospheric connection 80a of valve 81. The forward clutch thereupon smoothly engages and the operator may accelerate the vehicle in first speed relation.

In the event that it is now desired to establish the second gear relation, the control lever 27 is moved to the right in slot 30, this action exhausting the valve controlling the flow of fluid pressure to conduit 37 and operating another valve supplying fluid pressure through conduit 38 to the right-hand portion of the shifting actuator 9. When the first named valve is moved to exhaust position and the shifting actuator 9 is hence connected to atmosphere, the neutralizing piston 49, associated with the shifter actuator piston rod 16, and being constantly subjected to fluid pressure through conduit 51, promptly moves the shifter actuator to neutral position. In returning to neutral position, however, it will be noted that initial movement of the shifter piston rod 16 will effect operation of both of the clutch-controlling valves 56 and 57 through the cam 71 and thus both the forward and rear clutches will be disengaged. This operation of the clutches is also effected prior to actual disengagement of the transmission gears by reason of the lost motion connection between the shifter finger 15 and the shifter piston rod 16.

When the neutralizing operation above described has been completed, it will also be understood that the clutches are re-engaged in the manner heretofore described and the parts are returned to the position shown on the drawing. Operation of the valve controlling the flow of fluid pressure through conduit 38 will thereupon move the shifter piston 17 to the left, as viewed in the drawing, in order to establish second gear relation. Initial movement of the shifter piston will, however, effect operation of the clutch valves 56 and 57, thereby causing disengagement of the forward and rear clutches prior to establishment of second gear relation, and, when this relation is established, the rear and forward clutches will be sequentially engaged in the same manner as above described in connection with the establishment of the first gear relation.

Third gear relation is established by movement of the control lever 27 forwardly in the slot 31, this action causing shifting movement of the shifter bar 11 to the right, as viewed in the drawing. During establishment of third gear relation, no movement of the selector actuator takes place and fluid pressure is conducted directly to the left-hand portion of the shifter actuator through conduit 37.

Fourth gear relation is established by movement of the control lever 27 to the right in slot 31, such movement controlling the flow of fluid pressure directly to the shifter actuator 9 by way of conduit 38.

Selection and establishment of reverse gear relation is effected through movement of the control lever 36 to the right-hand extremity of slot 32, such movement establishing sequential selection of the shifter bar 10 and shifting of the latter to the left, as viewed in the drawing.

It will be of course understood that prior to and after the completion of the third, fourth and reverse gear relations referred to above, the forward and rear clutch actuators will be operated in order that during the actual shifting of gears, the transmission will be relieved of the transmission of torque.

By the present invention, there has thus been provided a combined clutch and gear-shifting control mechanism so constituted that control operations of the operation have been reduced to a minimum. In using the structure herein disclosed, a single manually-operable control member is provided for controlling the selection and establishment of a desired gear relation, while, at the same time, automatically controlling the engagement and disengagement of clutches positioned forwardly and rearwardly of the transmission. Such a construction relieves the transmission of the torques of the engine and driven shaft and thus greatly facilitates the gear-shifting operations. By associating the forward clutch actuator with the manually-operable clutch valve, manual control of the main clutch is retained, while, at the same time, automatic engagement of said clutch in a smooth and graduated manner is ensured. The association of the valve, controlling the exhausting of the forward clutch motor, with the rear clutch motor enables the initiation of the engagement of the rear clutch prior to that of the forward clutch, this feature being of great importance in the smooth transmission of torque from the engine to the driven shaft, after establishment of a new gear relation.

While one embodiment of the invention has been illustrated and described herein, it is to be understood that the invention is not limited to such embodiment but is capable of a variety of expressions, as will be clear to those skilled in the art. Reference will, therefore, be had to the appended claims for a definition of the limits of the invention.

What is claimed is:

1. In combination with a shiftable gear-changing element, a forward clutch-operating member, a rear clutch-operating member, and means energized by initial movement of said element in either of opposite directions from a neutral position for operating both said members.

2. In combination with a shiftable gear-changing element, a forward clutch-operating member, a rear clutch-operating member, separate means energized by initial movement of said element from a neutral position to a gear-establishing position for operating both said members, and means controlled by said energized means for the rear clutch-operating member for delaying operation of said forward clutch-operating member when said element has reached a gear-establishing position whereby engagement of the rear clutch prior to engagement of the forward clutch is secured.

3. In combination with a shiftable gear-changing element, a forward clutch-operating member, a rear clutch-operating member, a fluid motor for controlling said first member, a fluid actuator for controlling said second member, valve means for controlling the application and release of a fluid pressure differential to said motor and actuator, and means actuated by initial movement of said element in either direction from a neutral position for simultaneously operating said valve means.

4. In combination with a shiftable gear-changing element, a forward clutch-operating member, a rear clutch-operating member, a fluid motor for controlling said first member, a fluid actuator for controlling said second member, valve means operated by movement of said element from a neutral position to a gear-establishing relation for controlling the application of a fluid pressure differential to said motor and actuator, and means controlled by said actuator for preventing clutch-engaging movement of said motor until clutch-engaging movement of said actuator has taken place.

5. In combination with a shiftable gear-changing element, a forward clutch-operating member, a rear clutch-operating member, a fluid motor for controlling said first member, a fluid actuator for controlling said second member, valve means operated by movement of said element from a neutral position to a gear-establishing relation for controlling the application of a fluid pressure differential to said motor and actuator, and supplemental valve means controlled by said actuator for preventing clutch-engaging movement of said motor until clutch-engaging movement of said actuator has taken place.

6. In combination with a shiftable gear-changing element, a forward clutch-operating member, a rear clutch-operating member, fluid motors for operating said members, a pair of valves operated by gear-establishing movement of said element for controlling the flow of fluid pressure to said motors, said valves being moved to exhaust position upon completion of said movement of said element, and means controlled by said motor for said second member for delaying the exhaust of fluid pressure from said motor for the first member whereby clutch-engaging movement of the second member takes place prior to clutch-engaging movement of the first member.

7. In combination with a shiftable gear-changing element, a forward clutch-operating member, a rear clutch-operating member, fluid motors for operating said members, a pair of valves operated by gear-establishing movement of said element for controlling the flow of fluid pressure to said motors, said valves being moved to exhaust position upon completion of said movement of said element, and a manually-operable valve for controlling the exhaust from one of said valves and being operable to control the flow of fluid pressure to the motor for said first member only.

8. In combination with a shiftable gear-changing element, a forward clutch-operating member, a rear clutch-operating member, fluid motors for operating said members, a pair of valves operated by gear-establishing movement of said element for controlling the flow of fluid pressure to said motors, said valves being moved to exhaust position upon completion of said movement of said element, and a manually-operable valve for controlling the flow of fluid pressure to the motor for said first member only.

9. In combination with a shiftable gear-changing element, a forward clutch-operating member, a rear clutch-operating member, fluid motors for operating said members, a pair of valves operated by gear-establishing movement of said element for controlling the flow of fluid pressure to said motors, said valves being moved to exhaust position upon completion of said movement of said element, and a manually-operable valve for controlling the flow of fluid pressure to the motor for said first member only, said last named valve and said valve controlling the motor for the first member being connected so that the latter valve exhausts through the manually-operable valve when the element is in neutral or in a gear-establishing relation.

10. The combination with an automotive vehicle transmission having forward and rear clutches provided with fluid motors for controlling the disengaging and engaging movements thereof, of a shifter bar movable in opposite directions to establish either one of a pair of gear ratios, manually-operable valve means for controlling the flow of fluid pressure to said forward clutch motor, and valve means automatically operable by said movements of the shifter bar for controlling the flow of fluid pressure to the rear clutch motor.

11. The combination with an automotive vehicle transmission having forward and rear clutches provided with fluid motors for controlling the disengaging and engaging movements thereof, of a shifter bar movable in opposite directions to establish either one of a pair of gear ratios, means for controlling the flow of fluid pressure to said forward clutch motor including a manually-operable valve, valve means operated by said shifter bar during said movements from neutral position for controlling the flow of fluid pressure to the rear clutch motor, and means controlled by said rear clutch motor for preventing clutch-engaging movement of the front clutch motor until after a predetermined amount of clutch-engaging movement of the rear clutch motor has been effected.

12. In combination with a shiftable gear changing element, a forward clutch operating member, a rear clutch operating member, fluid motors for operating aid members, a pair of valves operated by gear establishing movement of said element for controlling the flow of fluid pressure to said motors, said valves being moved to exhaust position on completion of said movement of said element, and an independently operable valve for controlling the flow of fluid pressure to the motor for said first member only.

13. The combination with an automotive vehicle transmission having forward and rear clutches provided with fluid motors for controlling the disengaging and engaging movements thereof, of a shiftable member movable in opposite directions to establish either one of a pair of gear ratios, valve means for controlling the flow of fluid pressure to said forward clutch motor, and valve means automatically operable by said movements of said shiftable member for controlling the flow of fluid pressure to the rear clutch motor.

14. In combination with a transmission having a plurality of gear relations and forward and rear clutches, means including fluid actuators for controlling said clutches, a movable element for changing the gear relation in said transmission, valvular means for controlling the application and release of a fluid pressure differential to said forward clutch actuator, means operable automatically during movement of said element in changing gear relation for controlling the application of a fluid pressure differential to both of said actuators and for controlling the release thereof from said rear clutch actuator, and means controlled automatically by clutch engaging movement of said last named actuator for releasing a fluid pressure differential from said forward clutch actuator.

STEPHEN VORECH.